US010369872B2

(12) United States Patent
Jackson (10) Patent No.: US 10,369,872 B2
(45) Date of Patent: Aug. 6, 2019

(54) REMOVABLE PANEL ON AN AUTONOMOUS WORK VEHICLE

(71) Applicant: CNH Industrial America LLC, New Holland, PA (US)

(72) Inventor: Dwayne St. George Jackson, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/179,146

(22) Filed: Jun. 10, 2016

(65) Prior Publication Data

US 2017/0355252 A1    Dec. 14, 2017

(51) Int. Cl.

| G01C 22/00 | (2006.01) |
|---|---|
| G01M 17/00 | (2006.01) |
| B60J 9/00 | (2006.01) |
| A01B 69/00 | (2006.01) |
| G05D 1/00 | (2006.01) |
| B60J 1/08 | (2006.01) |

(52) U.S. Cl.
CPC ............... *B60J 9/00* (2013.01); *A01B 69/00* (2013.01); *A01B 69/001* (2013.01); *B60J 1/085* (2013.01); *G05D 1/0088* (2013.01)

(58) Field of Classification Search
CPC .......... B60J 9/00; A01B 69/00; G05D 1/0088
USPC .......................................................... 701/23
See application file for complete search history.

(56) References Cited

U.S. PATENT DOCUMENTS

| 9,802,638 | B1* | 10/2017 | Stoffel | B62D 1/26 |
|---|---|---|---|---|
| 2005/0198779 | A1* | 9/2005 | Jung | H04M 1/0212 |
| | | | | 16/367 |
| 2006/0070660 | A1* | 4/2006 | Swarts | B60R 15/00 |
| | | | | 137/355.12 |
| 2006/0175902 | A1* | 8/2006 | Matsubara | B60R 25/045 |
| | | | | 307/10.3 |
| 2007/0182215 | A1* | 8/2007 | Rose | B60R 16/005 |
| | | | | 296/211 |
| 2008/0048099 | A1* | 2/2008 | Nagai | G09B 5/06 |
| | | | | 250/208.5 |
| 2009/0117957 | A1* | 5/2009 | Araki | H04M 1/0262 |
| | | | | 455/575.8 |
| 2009/0251868 | A1* | 10/2009 | Strohmaier | G08C 17/00 |
| | | | | 361/747 |
| 2011/0162636 | A1* | 7/2011 | Gallo | F24B 1/207 |
| | | | | 126/523 |
| 2015/0161932 | A1* | 6/2015 | Kure | G09G 3/3426 |
| | | | | 345/690 |

(Continued)

*Primary Examiner* — Harry Y Oh
(74) *Attorney, Agent, or Firm* — Rebecca L. Henkel; Rickard K. DeMille (57) ABSTRACT

In one embodiment, an autonomous agricultural vehicle includes a control interface disposed in an enclosure of the autonomous agricultural vehicle and configured to at least setup or control operation of the autonomous agricultural vehicle, an implement attached to the autonomous agricultural vehicle, or a combination thereof. The autonomous agricultural vehicle further includes a removable panel at least partially removably coupled to the autonomous agricultural vehicle over the enclosure, wherein the removable panel is positioned to be accessible to an operator who is operating the autonomous agricultural vehicle outside of the autonomous agricultural vehicle.

20 Claims, 3 Drawing Sheets

(56) References Cited

U.S. PATENT DOCUMENTS

| | | | |
|---|---|---|---|
| 2015/0224863 A1* | 8/2015 | Yang | B60J 11/08 |
| | | | 150/168 |
| 2015/0296707 A1* | 10/2015 | Fukuda | A01D 34/008 |
| | | | 701/25 |
| 2015/0319913 A1* | 11/2015 | Foster | A01B 69/00 |
| | | | 701/26 |
| 2016/0030277 A1* | 2/2016 | Lee | A61F 7/032 |
| | | | 601/20 |
| 2016/0264021 A1* | 9/2016 | Gillett | B60K 1/04 |

* cited by examiner

REMOVABLE PANEL ON AN AUTONOMOUS WORK VEHICLE

BACKGROUND

The invention relates generally to work vehicles, and specifically, to removable panels on autonomous work vehicles.

Work equipment, such as agricultural vehicles (e.g., tractors) and implements (e.g., tillers, seeders, etc.), may be used to perform tasks at work sites, such as in an agricultural operation (e.g., farm). The work vehicles may be capable of manned and/or unmanned (e.g., autonomous) operation. For example, some work vehicles may only be capable of manned operation, while others may be capable of manned or autonomous operation. Typically, work vehicles that are manned by an operator include a control interface that is disposed within a cab of a vehicle. The operator interacts directly with the control interface to control operation of the vehicle and/or the implement. It would be beneficial, for example, to improve protection of the control interface.

BRIEF DESCRIPTION

In one embodiment, an autonomous agricultural vehicle includes a control interface disposed in an enclosure of the autonomous agricultural vehicle and configured to at least setup or control operation of the autonomous agricultural vehicle, an implement attached to the autonomous agricultural vehicle, or a combination thereof. The autonomous agricultural vehicle further includes a removable panel at least partially removably coupled to the autonomous agricultural vehicle over the enclosure, wherein the removable panel is positioned to be accessible to an operator who is operating the autonomous agricultural vehicle outside of the autonomous agricultural vehicle.

In one embodiment, a vehicle system includes an autonomous vehicle. The autonomous vehicle includes a removable panel at least partially removably coupled to the autonomous vehicle over an enclosure having a control interface used to control the autonomous vehicle, wherein the removable panel is positioned to be accessible to an operator who is operating the autonomous vehicle outside of the autonomous vehicle.

In one embodiment, an autonomous vehicle includes a control interface that includes a display and a first ignition switch. The autonomous vehicle also includes a second ignition switch. The first ignition switch and the second ignition switch are used in cooperation to control operation of the autonomous vehicle. The autonomous vehicle additionally includes a removable panel at least partially removably coupled to the autonomous vehicle over an enclosure having the control interface, wherein the removable panel is positioned to be accessible to an operator who is operating the autonomous vehicle outside of the autonomous vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Some embodiments of the present disclosure relate to providing a removable panel to protect a control interface. The panel described herein protects a more conveniently located and readily accessible control interface disposed on a side of a vehicle's cab. The control interface may be disposed in an external portion of an autonomous vehicle and is suitable for controlling autonomous vehicles that are capable of either autonomous or manual operation. Traditionally, some control interfaces in vehicles may be located on top of the vehicle in a cab. Such a location may prove to be inconvenient to access in vehicles that operate autonomously where the operator does not typically ride in the cab of the vehicle during operation because the operator has to climb into the cab to access the control interface and climb off of the vehicle before starting the vehicle again. To inhibit climbing into and out of the cab when the user desires to use the control interface, some embodiments may include mounting or disposing the control interface on a side of the autonomous vehicle. This side-mounted control interface may enable the operator to interact with the control interface while standing on the ground next to the autonomous vehicle. Further, in some embodiments, the control interface may be located at approximately eye level relative to an average height of a person. This may reduce the chance that the operator has to bend over to view a display of the control interface or strain his or her neck to look up at the display. It may be desirable to gain quick access to the control interface. Accordingly, the removable panel described herein may include features such as magnetic couples suitable for more efficient removable of the removable panel to gain access to the control interface.

Moreover, in some embodiments, the control interface may include a display (e.g., touch screen) that provides functionality to control operation of the autonomous work vehicle and/or an implement attached to the autonomous vehicle, as well as display information (e.g., fuel level, tire pressure, oil temperature, agricultural particulate prescription map, distribution schedule of the agricultural particulate, etc.) of the vehicle and/or the implement. The control interface may also include an ignition switch that has to be in an ON position, along with another ignition switch in a hybrid cab of the vehicle being in an ON position, for the autonomous vehicle to be operable (e.g., power on and operate). The control interface may also include a battery disconnect switch, a universal serial bus (USB) port, a stop button, and/or an autonomous/manual switch. The ease at which the operator is able to access the control interface may enhance operability of the autonomous vehicle and/or the implement by providing a more convenient experience to the operator. Accordingly, the removable panel protecting the control interface may include transparent, opaque, and/or semi-opaque coverings that may enable a user to see the controls included in the control interface while protecting the control interface form exposure, for example, of certain ultraviolet (UV) light.

It should be noted that the techniques disclosed may be used on any desired type of vehicle, but are particularly useful for work vehicles. More particularly, one presently contemplated application is in the area of agricultural work operations, such as on farms, in fields, in operations entailed in preparing, cultivating, harvesting and working plants and fields, and so forth. While in the present disclosure reference may be made to the vehicle 10 as an "agricultural vehicle", it should be borne in mind that this is only one particular area of applicability of the technology, and the disclosure should not be understood as limiting it to such applications.

Figure 1:
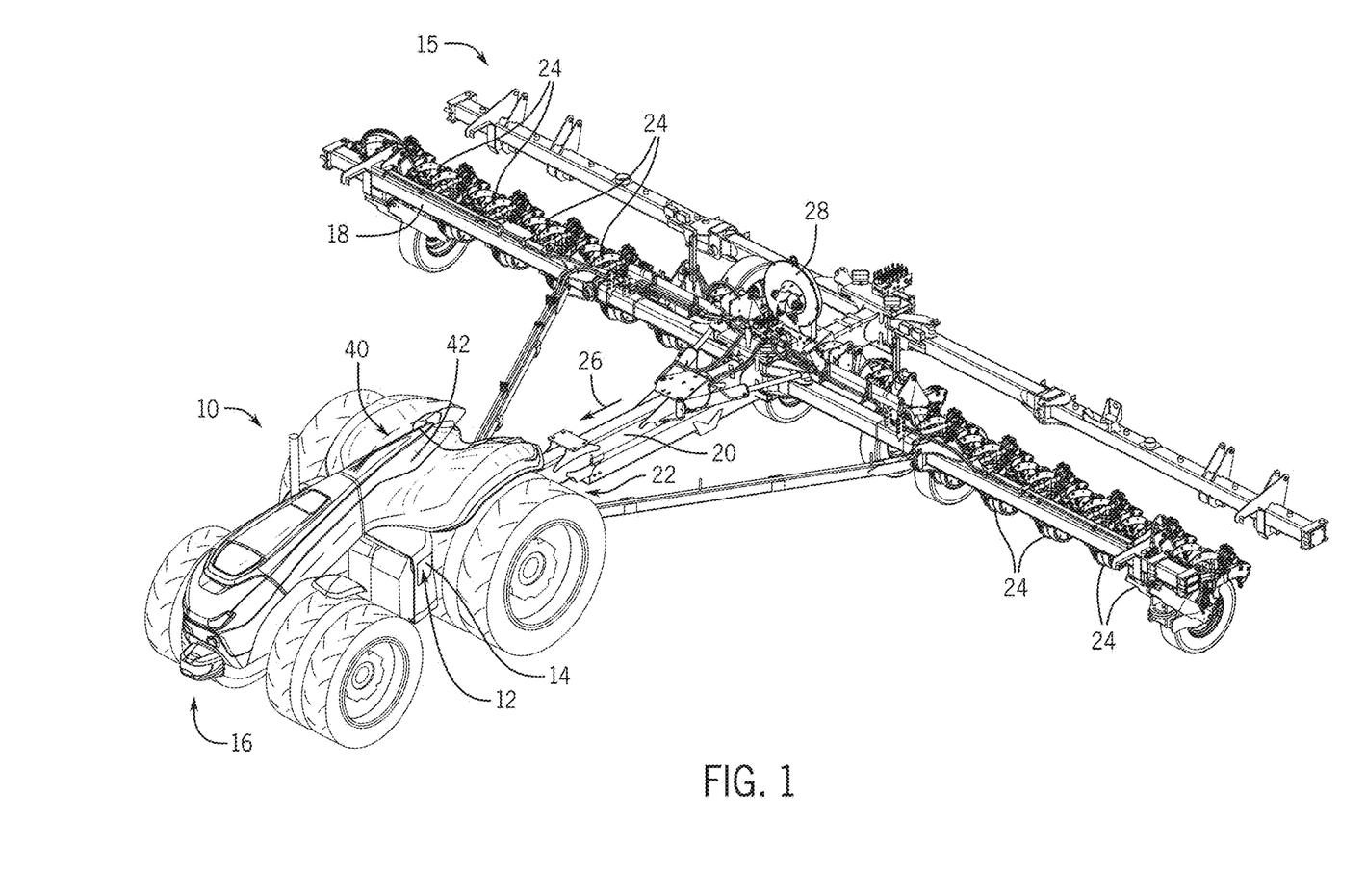
FIG. 1 is a perspective view of an embodiment of an autonomous vehicle including a side-mounted control interface and an attached implement, in accordance with an embodiment.

Turning now to FIG. 1, a perspective view of an embodiment of an autonomous agricultural vehicle 10 capable of autonomous or manual operation that includes a side-mounted control interface 12 covered via a removable panel 14. The autonomous agricultural vehicle 10 is shown towing an attached implement 15 is depicted, in accordance with an embodiment. The autonomous agricultural vehicle 10 includes a controller configured to automatically guide the autonomous agricultural vehicle 10 through a field (e.g., along a direction of travel 14) to facilitate agricultural operations. Example agricultural operations that the autonomous agricultural vehicle 10 and the implement 15 may perform include planting operations, seeding operations, application operations, tillage operations, harvesting operations, and the like. For example, the controller may automatically guide the agricultural vehicle 10 that pulls the implement 15 along a guidance swath through the field without input from an operator. The controller may also automatically guide the agricultural vehicle 10 around headland turns between segments of the guidance swath. To facilitate control of the autonomous agricultural vehicle, the controller includes a spatial locating device, such as a Global Position System (GPS) receiver, which is configured to output position information to the controller.

The autonomous agricultural vehicle 10 may be controlled remotely by an operator in a base station. As such, the autonomous agricultural vehicle 10 may be communicatively coupled to the base station. In some embodiments, operating autonomously may refer to the ability of the autonomous agricultural vehicle 10 to sense its environment and operate without input from the operator, as noted above. Thus, the autonomous agricultural vehicle 10 may include one or more sensors 16 that obtain data (e.g., object proximity, position of the vehicle 10, speed of the vehicle 10, weather, etc.) and provide the data to the controller of the autonomous agricultural vehicle 10. The controller may process the data to determine how to autonomously operate the autonomous agricultural vehicle 10 as desired.

Further, the controller may store an agricultural particulate prescription map (e.g., seeding rate, location of seeding to be disbursed, etc.) to execute to control the implement 15. In some embodiments, the control interface 12 mounted or disposed on the side of the autonomous agricultural vehicle 10 may be used by the operator to conveniently control operation of the implement 15. More specifically, the operator may approach the control interface 12 while standing on the ground and interact with the control interface 12 without climbing on top of a ladder or the autonomous agricultural vehicle 10. This may be particularly beneficial when the autonomous agricultural vehicle 10 is operating autonomously. Advantageously, the removable panel 14 may protect the control interface 12 from ingress of particulate matter (e.g., dust, chaff, debris, detritus) while also providing protection from ultraviolet (UV) light and sun exposure. The removable panel 14 may include techniques enable a quick removable of the removable panel 14 to gain access to the control interface 12, as further described below. Although the depicted implement 15 is a planter, it should be understood that any type of agricultural implement may be controlled by the control interface 12.

As depicted, the implement 15 includes a hollow support frame 18, a tow frame 20, a hitch assembly 22, and row units 24. More specifically, one end of the tow frame 20 is connected to the hollow support frame 18 and the other end is connected to the hitch assembly 22, which enables a coupling to the autonomous agricultural vehicle 10. Thus, the implement 15 may be towed along a direction of travel 26 by the autonomous agricultural vehicle 10.

Additionally, as depicted, a plurality of row units 24 is coupled to the hollow support frame 18. Thus, as the autonomous agricultural vehicle 10 tows the implement 15, each of the row units 24 may deposit seeds at a desired depth beneath the soil surface, thereby establishing rows of planted seeds. It should be noted that the number of row units 24 may be adjusted based on a desired number of seed rows. In other words, the implement 15 may be adjusted to include 6, 8, 12, 16, 24, 32, or 36 row units, or more.

Furthermore, the spacing between row units 24 may be selected based on the type of seed being planting. For example, the row units 24 may be spaced 30 inches from one another when planting corn, and 15 inches from one another when planting soy beans. As such, the number and/or spacing of the row units 24 may be adjusted multiple times during the lifespan of the implement 15.

As described above, the row units 24 may control the planting of seeds. More specifically, each row unit 24 may utilize vacuum pressure to control the seed flow rate and/or the spacing between planted seeds. Accordingly, in the depicted embodiment, a vacuum source 28 is mounted on the support frame 18. In the depicted embodiment, the implement 15 utilizes a single centralized vacuum source. Additionally or alternatively, multiple vacuum sources may be used. For example, a first vacuum source may supply vacuum pressure to half of the row units 24, and a second vacuum source may supply vacuum pressure to the other half of the row units 24.

In some embodiments, the vacuum source 28 may be a fan that displaces air to generate vacuum pressure. For example, the vacuum source 28 may expel air from the row units 24 to generate a negative vacuum pressure. Thus, any suitable vacuum source 28 may be utilized, such as a hydraulically driven fan, an electrically drive fan, and so forth. Moreover, embodiments of the fan may include an axial fan, a blower-type fan, a plurality of parallel fans, a plurality of sequential fans, a turbine-type fan, or any combination thereof. To facilitate distributing the vacuum pressure, a conduit or tubing system may be used to pneumatically couple the vacuum source 28 to the hollow frame structure 18.

The control interface 12 and the removable panel 14 may be mounted or disposed on the side of the autonomous agricultural vehicle 10. After removing and/or opening the removable panel 14 and gaining access to the control interface 12, the control interface 12 may be used to setup and/or control seeding rates and/or vacuum levels of the implement 15, to log data related to work performed by the autonomous agricultural vehicle 10 and/or the implement 15 (e.g., portions of field worked, the agricultural particulate levels and distribution), and the like. Further, as described below, the control interface 12 may include a first ignition switch that is connected in series to a second ignition switch disposed within a hybrid cab 40 of the autonomous agricultural vehicle 10. The hybrid cab 40 may include a cover 42 that conceals a compartment of the hybrid cab 40 that includes a foldable chair for an operator to sit in, a steering wheel or steering assembly, and/or the second ignition switch, among other things.

Figure 2:
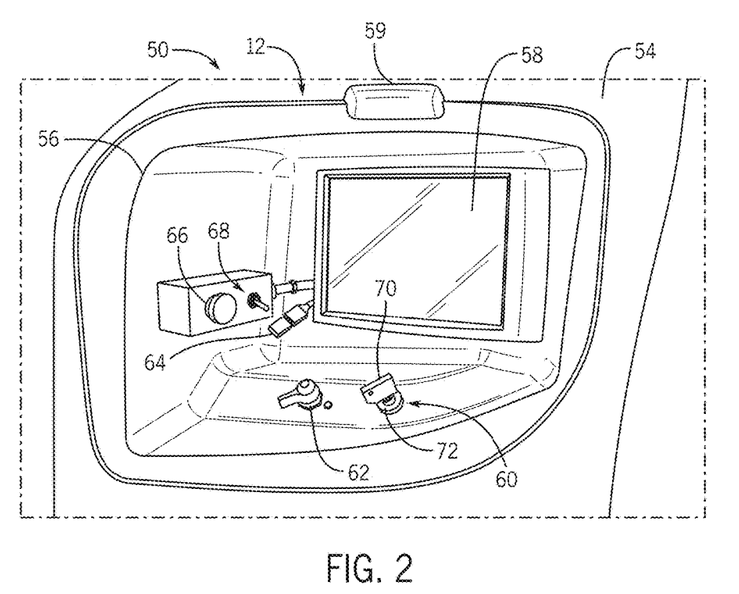
FIG. 2 is a zoomed-in view of the portion of the autonomous vehicle of FIG. 1 including the side-mounted control interface with a removable panel removed, in accordance with an embodiment.

FIG. 2 is a zoomed-in view of a portion 50 of the autonomous agricultural vehicle 10 of FIG. 1 including the side-mounted control interface 12 disposed behind the removable panel 14, in accordance with an embodiment. As depicted, removing the removable panel 14 exposes the control interface 12 to enable an operator to access the control interface 12. The side panel 54 may include an enclosure 56 that includes the control interface 12 and is covered by the removable panel 14 when the removable panel 14 is locked into place on the side panel 54. The side panel 54 may additionally include a recess portion 59 suitable for providing a handhold when removing the removable panel 14. The control interface 12 may include a display 58, an ignition switch 60, a battery disconnect 62, a USB port 64, a stop button 66, and/or an autonomous/manual switch 68.

In some embodiments, the display 58 may include a touch screen display. The display 58 may be a liquid crystal display (LCD), a light-emitting diode (LED) display, a cathode ray tube (CRT), an image projection device, a plasma display, or any other type of display or device capable of presenting an image visible to an operator. In some embodiments, the display 58 may not be touch compatible. Instead, one or more input peripherals, such as buttons, dials, touch pads, keyboards, a mouse, microphones, and the like may be included in the control interface 12 and used to control the display 58. As depicted, the display 58 may be exposed on the side of the autonomous agricultural vehicle 10. As such, an operator may access the control interface 12 including the display 58 by standing next to the control interface 12 including the display 58 without having to climb on top of the autonomous agricultural vehicle 10, which may be particularly beneficial when autonomous operation is enabled. That is, the operator may be standing on the same surface that the autonomous agricultural vehicle 10 is disposed upon when accessing the control interface 12 including the display 58.

As discussed above, the display 58 may be used to setup and/or control the operation of the implement 15. As such, the display 58 may display a graphical user interface with various icons, buttons, lists, information, widgets, charts, gauges, graphs, maps, or the like, that may be usable by or informative to the operator. For example, the operator may use the display 58 to configure an agricultural particulate prescription map (e.g., seeding rates, seeding location on the terrain, etc.) and/or a distribution plan (e.g., seeding schedule) of the implement 15. Further, the display 58 may display various information related to the implement 15, such as the vacuum levels of the implement, amount of agricultural particulate, type of agricultural particulate, the particulate prescription map, the distribution plan, implement geometry, and the like. Also, the display 58 may display various information related to the autonomous agricultural vehicle 10, such as fuel level, fuel usage, vehicle geometry, vehicle to base station communication, oil pressure, any alerts triggered, whether the ignition switch 60 is in the ON or OFF position, whether the other ignition switch in the hybrid cab 40 is in the ON or OFF position, an operation plan (e.g., travel route on a digital representation of the terrain, speeds, schedule), a digital representation of the location of the autonomous agricultural vehicle 10 on a map of the terrain, and the like. Additionally, the display 58 may display the software version of the operating system responsible for operating the autonomous agricultural vehicle 10 and/or the graphical user interface displayed on the display 58.

In some embodiments, the ignition switch 60 may include a key 70 and a lock 72. The ignition switch 60 may be wired in series to another ignition switch disposed on top of the autonomous agricultural vehicle 10 (e.g., inside of the hybrid cab 40). As such, in some embodiments, operating the autonomous agricultural vehicle 10 may dictate that both ignition switches are in an ON position. For example, when the key 70 is inserted into the lock 72 and turned to an ON position and the ignition switch in the hybrid cab 42 is in the ON position, the autonomous agricultural vehicle 10 may be operable. In some embodiments, a base station may remotely start the autonomous agricultural vehicle 10 when both of the ignition switches are in the ON position. If one of the ignitions switches is in an OFF position, then the autonomous agricultural vehicle 10 may be inoperable. For example, if the key 70 is turned to the OFF position or the ignition switch in the hybrid cab 42 is turned to the OFF position, the autonomous agricultural vehicle 10 may not be remotely started.

The battery disconnect 62 may disconnect the battery from being used by the autonomous agricultural vehicle 10. The battery disconnect 62 may be used to isolate the battery from the rest of the electrical system. In some embodiments, the battery disconnect 62 may sever the positive connection from the battery. Alternatively, the battery disconnect 62 may sever the negative connection from the battery. As depicted, the battery disconnect 62 may be a physical switch that is manually flipped to disconnect the battery. However, in some embodiments, the battery disconnect 62 may be a soft switch, in that a digital button may be displayed on the display 58 that represents the battery disconnect 62. When the digital button is touched on the screen by the user, the battery disconnect 62 may cause a controller or a mechanism to disconnect the battery.

In some embodiments, the USB port 64 may be used to upload or download data to a controller of the autonomous agricultural vehicle 10. The control interface 12 may include the USB port 64 with an extension cord or the like to enable convenient access to an operator standing next to the vehicle 10. The operator can connect a jump drive, flash drive, external hard drive, smartphone, computing device, laptop, tablet, or the like, to download data from or upload data to the controller. For example, the operator may download fuel usage, an agricultural particulate prescription map, a distribution schedule of the implement, a travel route of the autonomous agricultural vehicle 10, any alerts that were triggered over a certain time period, and the like. Further, the operator may upload certain data to the controller via the USB port 64, such as an agricultural particulate prescription map (e.g., the locations where particulate is to be disbursed and the amount of particulate to disburse), a travel route for the autonomous agricultural vehicle 10, desired fuel usage, schedule of distribution, and the like. It should be understood that the USB port 64 may not be limited to the USB protocol. Other serial bus communication protocols (e.g., Ethernet, Profibus, FireWire, etc.) may be used as the port 64 or as one or more additional ports to communicate data over a bus between the controller and a connected device.

In some embodiments, the stop button 66, when pressed, may cause the autonomous agricultural vehicle 10 to stop and power down. The stop button 66 may stop and power down the vehicle 10 when pressed while the vehicle 10 is operating in autonomous or manual mode.

In some embodiments, the autonomous/manual switch 68 may enable the autonomous agricultural vehicle 10 to operate in an autonomous mode or a manual mode. For example, when the autonomous/manual switch 68 is set to autonomous, the autonomous agricultural vehicle 10 may operate autonomously by using stored travel routes, data from the sensors 16, agricultural particulate prescription maps, distribution schedules, or the like. When the autonomous/manual switch 68 is set to manual, the controller may enable the autonomous agricultural vehicle 10 to be operated locally. For example, the controller may ignore commands received from a base station and the hybrid cab 40 may be converted to enable the operator to sit on top of the autonomous agricultural vehicle 10 to operate the vehicle 10 using a gas pedal, brake, gear shift, steering wheel, and so forth.

Figure 3:
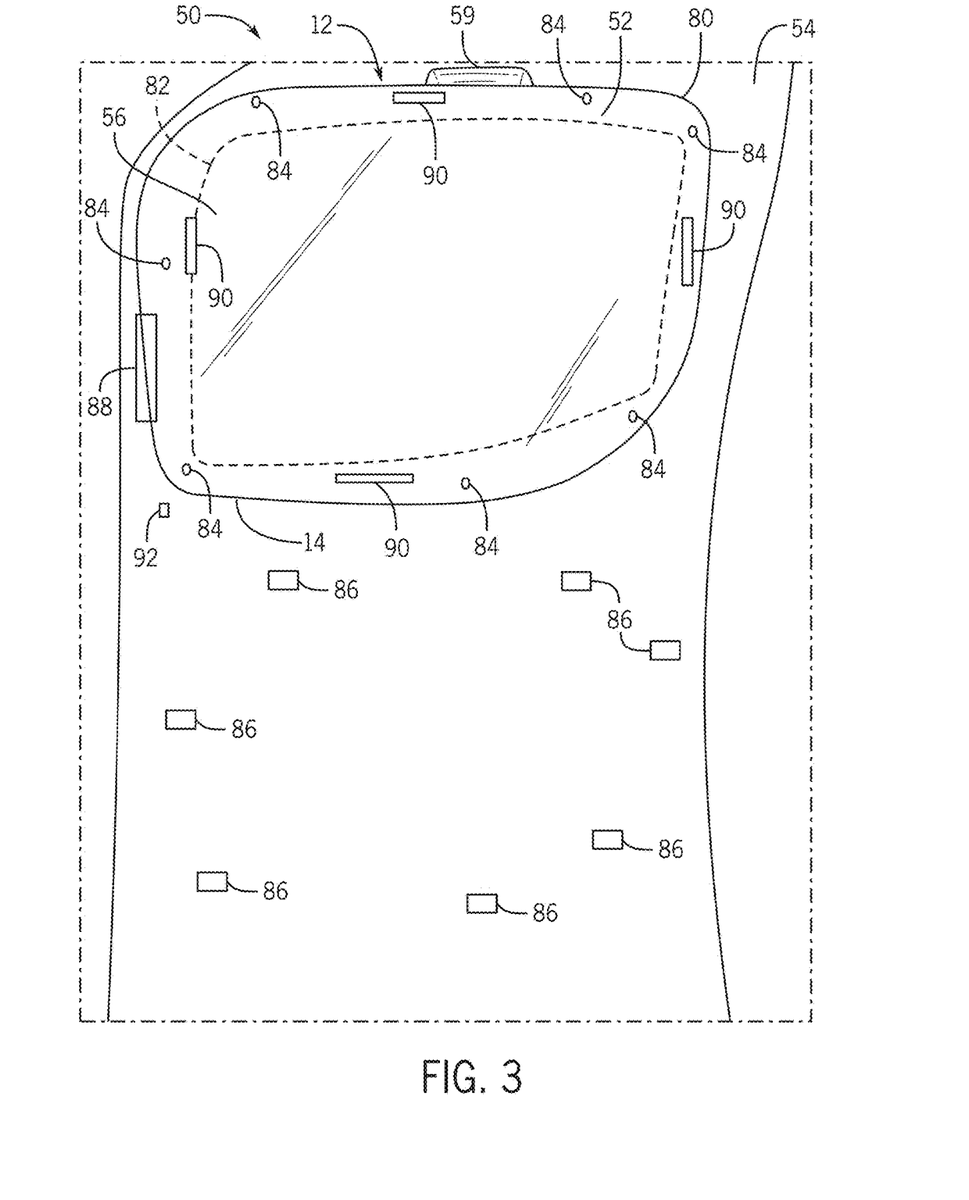
FIG. 3 is a zoomed-in view of a portion of the autonomous vehicle of FIG. 1 showing an embodiment of the removable panel.

Turning now to FIG. 3, the figure illustrates an embodiment of the removable panel 14 disposed to cover the control interface 12. The removable panel 14 may be semi-transparent (e.g., opacity level from 0 to 90 percent) to enable an operator to see through the removable panel 14 and view the information displayed on the display of the control interface 12. In some embodiments, the removable panel 14 may be semi-transparent (e.g., not fully transparent) because it may be desirable to block certain light rays from contacting the display of the control interface 12. As such, the removable panel 14 may be tinted or coated with a darkening layer.

In other embodiments, the removable panel 14 may include dynamic transparency. For example, photochromic or adaptive embodiments may turn darker as more UV light is received by the removable panel 14. In these embodiments, when the autonomous vehicle 10 is in a garage, for example, less UV light received via the removable panel 14 may turn the removable panel 14 substantially transparent, thus enabling an operator from more easily viewing the control interface 12 systems, such as the display 58. During operations, as more UV light is received, the removable panel 14 may turn darker, thus protecting the control interface 12 from UV exposure and increasing a life for the control interface 12. In addition to or alternative to photochromics, electrochromics may be used. In electrochromic embodiments, a photo sensor 80 may be used to detect ambient light conditions and an electrical current may be applied to darken or lighten the removable panel 14.

Further, the removable panel 14 may be durable enough to protect the removable panel 14 from the environment and certain objects (e.g., water, hail, rocks, dirt, dust, etc.). In some embodiments, a seal 82 may be used to abut against portions of the panel 54 to provide for enhanced protection against ingress of unwanted particles or liquids into the enclosure 56. The seal 82 may be manufactured out of rubber, silicon, plastics, and so on, suitable for use as a barrier against the entry of the particles or liquids into the enclosure 56.

The removable panel 14 may be manufactured out of plastic, acrylic, glass, polycarbonates, or a combination thereof. The removable panel 14 may include one or more magnets 84 that may mate with metal disposed in the panel 54 to removably couple the removable panel 14 to the panel 54. In use, the operator may reach into the recess 59, grasp the removable panel 14, and pull outwardly to completely detach the removable panel 14 from the panel 54. In some embodiments, removing or partially removing the removable panel 14 may trigger the control interface 12 to turn on the display 58. For example, proximity sensors in the enclosure 56 may be communicatively coupled to the control interface 12 and used to detect removal or partial removal of the removable panel 14.

While the removable panel 14 is manufactured light enough to be held during use of the control interface 12, in certain embodiments, the panel 54 may include metal sections 86 that may be used to magnetically reattach the removable panel 14 to the panel 54. Once the control interface 12 has been used, for example to enter control inputs for the autonomous vehicle 10, the removable panel 14 may be reattached to cover the enclosure 56. It is to be understood that the magnets 84, in some embodiments, may be disposed as part of the panel 54 and the removable panel 14 may then include metal pieces or other magnets to magnetically attach to the panel 54.

In other embodiments, the removable panel 14 may include a hinge 88 as an alternative to or in addition to the magnets 84. In hinged embodiments, the operator may still grasp the removable panel 14 via the recess 59 and pull outwardly. However, the removable panel 14 may then pivot about the hinge 88 as opposed to completely detach from the panel 54. In these embodiments, the removable panel 14 may be partially removable, with the hinge 88 maintaining the removable panel 14 partially attached to the panel 54.

Also shown are lights 90 that may be used to provide illumination into the enclosure 56 and the control interface 12. The lights 90 may be LED lights, incandescent lights, florescent lights, and the like. In use, a switch 90 may be activated by the operator to provide for added illumination of the enclosure 56 and the control interface 12. Additionally or alternatively, the photo sensor 80 may sense low light conditions and turn on the lights 90 to provide the added illumination. By providing for the removable panel 14, the control interface 12 may be protected from UV light and the ingress of unwanted particulates and fluids.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An autonomous agricultural vehicle, comprising:
a control interface disposed in an enclosure of the autonomous agricultural vehicle and configured to at least setup or control operation of the autonomous agricultural vehicle, the control interface comprising a stop button configured to stop the autonomous vehicle, an implement attached to the autonomous agricultural vehicle, or a combination thereof, wherein the enclosure is not included inside of a cabin or a passenger cab and does not-comprise the cabin or the passenger cab;
an ignition switch;
an autonomous/manual switch, wherein the ignition switch and the autonomous/manual switch are used in cooperation to control operation of the autonomous agricultural vehicle; and
a toollessly removable panel coupled to the autonomous agricultural vehicle over the enclosure to cover the control interface, wherein the toollessly removable panel is positioned to be accessible to an operator who is operating the autonomous agricultural vehicle outside of the autonomous agricultural vehicle, and wherein the toollessly removable panel is configured to be completely removed from the enclosure without using tools, or opened and closed over the enclosure via an attachment mechanism, to access the control interface.

2. The autonomous vehicle of claim 1, wherein the enclosure and the toollessly removable panel are positioned on a side of the autonomous vehicle and accessible to the operator of the autonomous agricultural vehicle.

3. The autonomous agricultural vehicle of claim 1, wherein the toollessly removable panel comprises at least one magnet and wherein the autonomous agricultural vehicle comprises a metal portion or a second magnet aligned so that the at least one magnet magnetically couples the toollessly removable panel to the autonomous agricultural vehicle over the enclosure.

4. The autonomous agricultural vehicle of claim 1, wherein the attachment mechanism comprises a hinge at coupling the toollessly removable panel to the autonomous agricultural vehicle to enable the removable panel to open and to close over the enclosure.

5. The autonomous agricultural vehicle of claim 1, wherein the toollessly removable panel comprises an opacity level from 0 to 90 percent.

6. The autonomous agricultural vehicle of claim 5, wherein the toollessly removable panel comprises a photochromic removable panel, an electrochromic removable panel, or a combination thereof, configured to automatically change the opacity level.

7. The autonomous agricultural vehicle of claim 1, wherein the toollessly removable panel comprises at least one light configured to illuminate the control interface.

8. The autonomous agricultural vehicle of claim 1, wherein the autonomous agricultural vehicle comprises a recess disposed about the enclosure and configured to enable a human hand to grab the toollessly removable panel.

9. The autonomous agricultural vehicle of claim 1, wherein the toollessly removable panel is completely removable from the autonomous agricultural vehicle.

10. The autonomous agricultural vehicle of claim 1, wherein the toollessly removable panel comprises a seal configured to abut against the autonomous agricultural vehicle to prevent ingress of particles or fluids into the enclosure.

11. A vehicle system, comprising:
an autonomous vehicle, the autonomous vehicle comprising:
a toollessly removable panel coupled to the autonomous vehicle over an enclosure having a control interface used to control the autonomous vehicle, the control interface comprising a stop button configured to stop the autonomous vehicle, wherein the enclosure is not included inside of a cabin or a passenger cab and does not comprise the cabin or the passenger cab, wherein the toollessly removable panel covers the control interface, wherein the toollessly removable panel is positioned to be accessible to an operator who is operating the autonomous vehicle outside of the autonomous vehicle, and wherein the toollessly removable panel is configured to be completely removed from the enclosure without using tools, or opened and closed over the enclosure via an attachment mechanism, to access the control interface;
an ignition switch; and
an autonomous/manual switch, wherein the ignition switch and the autonomous/manual switch are used in cooperation to control operation of the autonomous vehicle.

12. The system of claim 11, wherein the toollessly removable panel comprises at least one magnet and wherein the autonomous vehicle comprises a metal portion or a second magnet aligned so that the at least one magnet magnetically couples the toollessly removable panel to the autonomous vehicle over the enclosure.

13. The system of claim 11, wherein the attachment mechanism comprises a hinge coupling the toollessly removable panel to the autonomous agricultural vehicle to enable the toollessly removable panel to open and to close over the enclosure.

14. The system of claim 11, wherein the toollessly removable panel comprises an opacity level from 0 to 90 percent.

15. The system of claim 14, comprising the control interface having a display, wherein the control interface is configured to turn on the display when the toollessly removable panel is at least partially removed from the autonomous vehicle, when the removable panel is opened, or a combination thereof.

16. The system of claim 11, wherein the toollessly removable panel comprises at least one light configured to illuminate the control interface.

17. The system of claim 11, wherein the toollessly removable panel is completely removable from the autonomous vehicle.

18. An autonomous vehicle, comprising:
a control interface comprising:
a display; and
an ignition switch; and
an autonomous/manual switch, wherein the ignition switch and the autonomous/manual switch are used in cooperation to control operation of the autonomous vehicle; and
a removable panel coupled to the autonomous vehicle over an enclosure having the control interface to cover the control interface, the control interface comprising a stop button configured to stop the autonomous vehicle, wherein the enclosure does not comprise a passenger cab, wherein the removable panel is positioned to be accessible to an operator who is operating the autonomous vehicle outside of the autonomous vehicle, and wherein the removable panel is configured to be completely removed from the enclosure, or opened and closed over the enclosure via an attachment mechanism, to access the control interface.

19. The autonomous vehicle of claim 18, wherein the removable panel comprises at least one magnet and wherein the autonomous vehicle comprises a metal portion or a second magnet aligned so that the at least one magnet magnetically couples the removable panel to the autonomous vehicle over the enclosure.

20. The autonomous vehicle of claim 18, wherein the removable panel is completely removable from the autonomous vehicle.

\* \* \* \* \*